(12) United States Patent  (10) Patent No.: US 7,414,656 B2
Lee et al.  (45) Date of Patent: Aug. 19, 2008

(54) MOBILE TERMINAL WITH CAMERA (75) Inventors: Yong-Hee Lee, Gyeonggi-Do (KR); Joon Jang, Seoul (KR)

(73) Assignee: Le Electronics Inc., Seoul (KR)

( * ) Notice: Subject to any disclaimer, the term of this patent is extended or adjusted under 35 U.S.C. 154(b) by 685 days.

(21) Appl. No.: 10/624,524

(22) Filed: Jul. 23, 2003

(65) Prior Publication Data

US 2006/0003817 A1 Jan. 5, 2006

(30) Foreign Application Priority Data

Jul. 30, 2002 (KR) ...................... 10-2002-0045057

(51) Int. Cl.
*H04N 5/222* (2006.01)
*H04N 5/225* (2006.01)
*H04M 1/00* (2006.01)
(52) U.S. Cl. ............... 348/333.06; 348/376; 348/14.01; 455/575.3; 455/556.1
(58) Field of Classification Search ......... 348/373–376, 348/333.06; 455/575.3
See application file for complete search history.

(56) References Cited

U.S. PATENT DOCUMENTS

| | | | |
|---|---|---|---|
| 5,491,507 A | * | 2/1996 | Umezawa et al. ........ 348/14.02 |
| 5,537,175 A | | 7/1996 | Kamaya et al. |
| 6,069,648 A | * | 5/2000 | Suso et al. ................ 348/14.02 |
| 6,466,202 B1 | * | 10/2002 | Suso et al. ................ 455/575.3 |
| 6,690,417 B1 | * | 2/2004 | Yoshida et al. ........... 455/556.1 |
| 6,965,413 B2 | * | 11/2005 | Wada ......................... 348/376 |
| 7,076,271 B2 | * | 7/2006 | Ban et al. ................. 455/556.1 |
| 2001/0038412 A1 | | 11/2001 | McNelley et al. |
| 2002/0051060 A1 | | 5/2002 | Wada |
| 2004/0075620 A1 | * | 4/2004 | Tanaka et al. .......... 348/207.99 |
| 2004/0090552 A1 | * | 5/2004 | Watanabe et al. ........... 348/373 |
| 2004/0192220 A1 | * | 9/2004 | Huang et al. ............. 455/556.1 |

FOREIGN PATENT DOCUMENTS

| | | |
|---|---|---|
| JP | 2001-1320463 | 11/2001 |
| JP | 2002-2141977 | 5/2002 |
| KR | 2002-0014156 | 2/2002 |
| KR | 2002/0038182 | 5/2002 |
| KR | 2002-0038182 | 5/2002 |
| KR | 2001-0047067 | 6/2003 |
| KR | 10-2004-0006710 | 1/2004 |

OTHER PUBLICATIONS

Korean Office Action dated Jul. 28, 2004.

* cited by examiner

*Primary Examiner*—Nhan T Tran
(74) *Attorney, Agent, or Firm*—Ked & Associates, LLP

(57) ABSTRACT

A folding-type mobile terminal is provided with a camera that is capable of accurately imaging an object. This is accomplished by mounting the camera such that a viewing direction of the display of the terminal is substantially parallel to a camera imaging direction.

32 Claims, 9 Drawing Sheets

MOBILE TERMINAL WITH CAMERA

BACKGROUND OF THE INVENTION

1. Field of the Invention

The present invention relates to a mobile terminal with a camera and, more particularly, to a mobile terminal with a camera positioned such that an imaging direction substantially corresponds to the direction that a user looks toward to view the display screen.

2. Background of the Related Art

Currently, mobile terminals, such as cellular phones, are being developed with multimedia functionality, in addition to the standard voice transmission and reception functions. Mobile terminals with color liquid crystals for displaying image information with diverse colors, and cameras for inputting the image information are on the increase.

Mobile terminals with cameras are roughly divided into two types. The first type is an internal camera type mobile terminal in which a camera is fixedly inserted in the terminal. The second type is an external camera type mobile terminal in which a camera is detachably mounted on the terminal.

With the internal camera type mobile terminal, the camera can be mounted at a folder, at a main body of a terminal or at a hinge connection part between the folder and the main body.

If the camera is mounted at the folder, interference occurs between the camera and the LCD mounted at the folder. In addition, spatial restriction arises as the thickness of the folder is increased.

If the camera is mounted at the hinge connection part, interference arises between the hinge connection part and the flexible printed circuit (FPC), and since the camera is rotated around the hinge connection part, it can be easily damaged as its rate of use increases. In order to avoid these problems, the camera is typically mounted at the main body.

Figure 1:
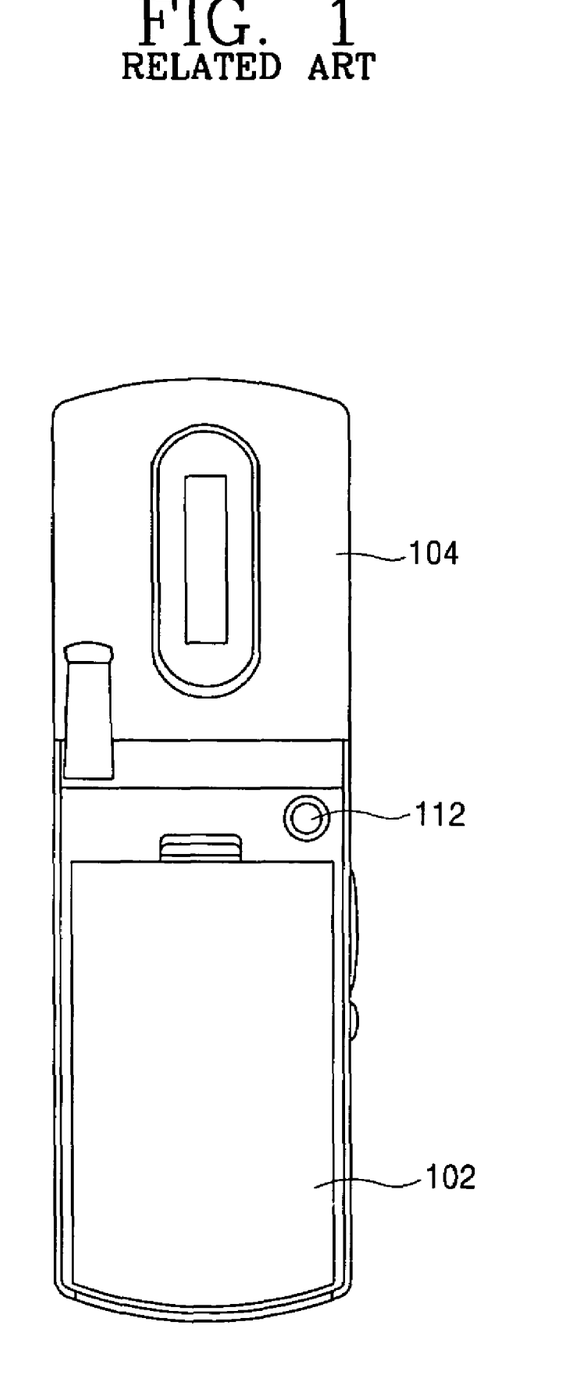
FIG. 1 is a front view of an internal camera type mobile terminal with an open folder, in accordance with the related art.
Figure 2:
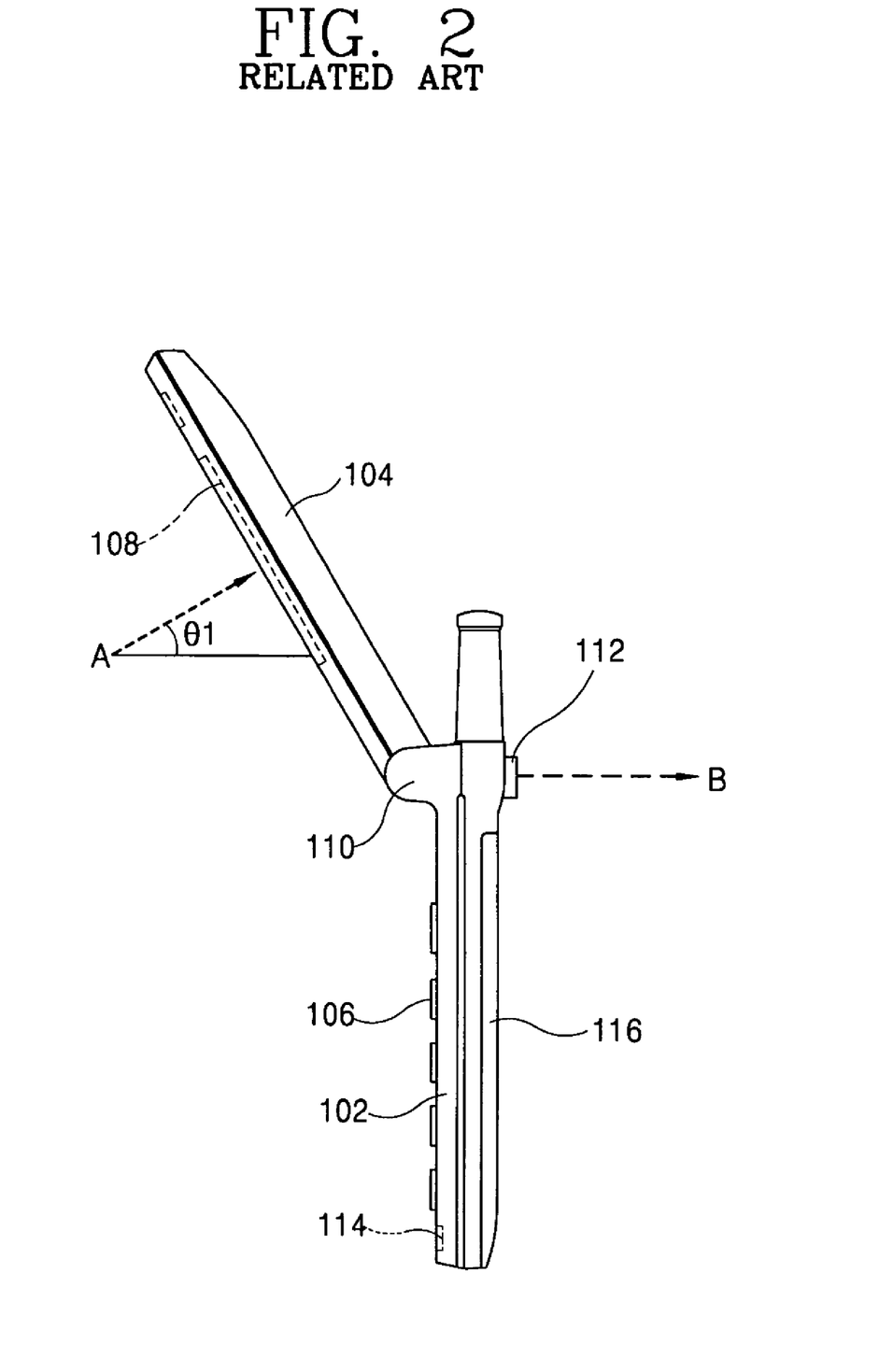
FIG. 2 is a side view of the internal camera type mobile terminal of FIG. 1, in accordance with the related art.

FIG. 1 is a front view of an internal camera type mobile terminal with an open folder, in accordance with the related art, and FIG. 2 is a side view of the internal camera type mobile terminal with an open folder, in accordance with the related art.

The internal camera type mobile terminal, in accordance with the related art, includes: a main body 102 having various menu buttons 106 formed at a front surface and a printed circuit board (PCB) (not shown); a folder 104 foldably connected to the main body 102 and having a liquid crystal screen 108 formed at the front surface; a hinge connection part 110 foldably connecting the main body 102 and the folder 104; and a camera module 112 mounted at a rear surface of the main body 102 for photographing a subject.

A microphone 114 is mounted at a lower portion of the main body 102 to transfer a voice signal, and a battery 116 is mounted at a rear surface of the main body 102. The camera module 112 is mounted at the rear surface of the main body 102 so that a subject photographing direction makes a 90 degree angle with respect to the rear surface of the main body 102.

That is, when the folder 104 of the terminal is opened, since the angle between the folder 104 and the main body 102 is maintained at about 150°, the direction (A) that a user looks toward to view the LCD screen 108 of the folder 104 and a photographing direction (B) of the camera module 112 are maintained at an angle of about 30° (θ1).

Thus, with the related art internal camera type mobile terminal, when the user opens the folder and photographs while viewing the LCD screen, if the user looks at the LCD screen straight on, the photographing direction of the camera is inclined downwardly by about 30°, which makes it difficult to accurately photograph a subject and is inconvenient to use.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a folding-type mobile terminal with a handy camera that is capable of accurately photographing an object due to a camera mounting position that lets a direction that a user looks toward to view an LCD screen substantially correspond to a camera photographing direction.

To achieve at least the above objects, in whole or in part, there is provided a mobile terminal with a camera including: a main body; a folder foldably connected to the main body and having liquid crystal display (LCD) screen formed thereon; and a camera module mounted at one side of the main body for imaging a target, wherein the camera module is mounted such that a direction that viewing direction of the LCD screen and an imaging direction of the camera module are substantially parallel.

To achieve at least the above objects, in whole or in part, there is further provided a subscriber unit including: a first portion; a second portion foldably connected to the first portion to allow open and closed configurations; a display on the second portion and a camera mounted on the first portion such that a display viewing direction is substantially parallel to a camera imaging direction.

In one embodiment of the mobile terminal with a camera, in accordance with the present invention, the camera module is mounted at an upper side of a rear surface of the main body at an angle such that a target imaging direction makes an angle of approximately 90° with respect to the rear surface of the folder when the folder is opened.

In one embodiment of the mobile terminal with a camera, in accordance with the present invention, the camera module is mounted such that an angle of approximately 30° is formed between the target imaging direction and the normal to the rear surface of the main body.

In one embodiment of the mobile terminal with a camera, in accordance with the present invention, a protrusion having a predetermined angle is preferably formed at an upper portion of the rear surface of the main body, and has a front surface that is substantially level with the rear surface of the folder when the folder is opened.

In one embodiment of the mobile terminal with a camera, in accordance with the present invention, the protrusion is preferably formed such that its front surface makes an angle of approximately 30° with respect to the rear surface of the main body.

In one embodiment of the mobile terminal with a camera, in accordance with the present invention, the camera module is mounted at the protrusion so that a target imaging direction makes an angle of approximately 90° with respect to the front surface of the protrusion.

In one embodiment of the mobile terminal with a camera, in accordance with the present invention, a reflection mirror is preferably mounted at the front surface of the protrusion in order to reflect an image of the user when the user images himself/herself.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Figure 3:
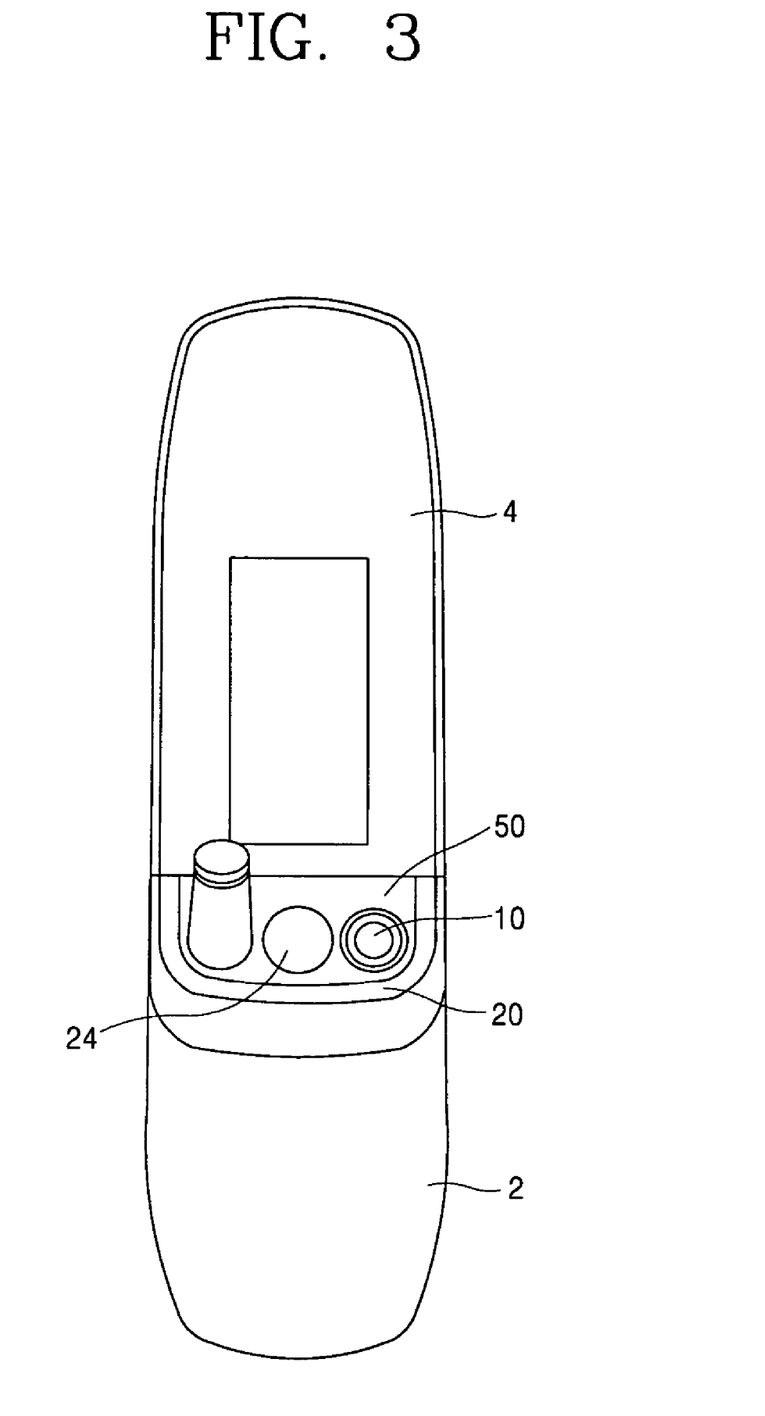
FIG. 3 is a front view of a mobile terminal with a camera, in accordance with one embodiment of the present invention, with a folder in an open state.
Figure 4:
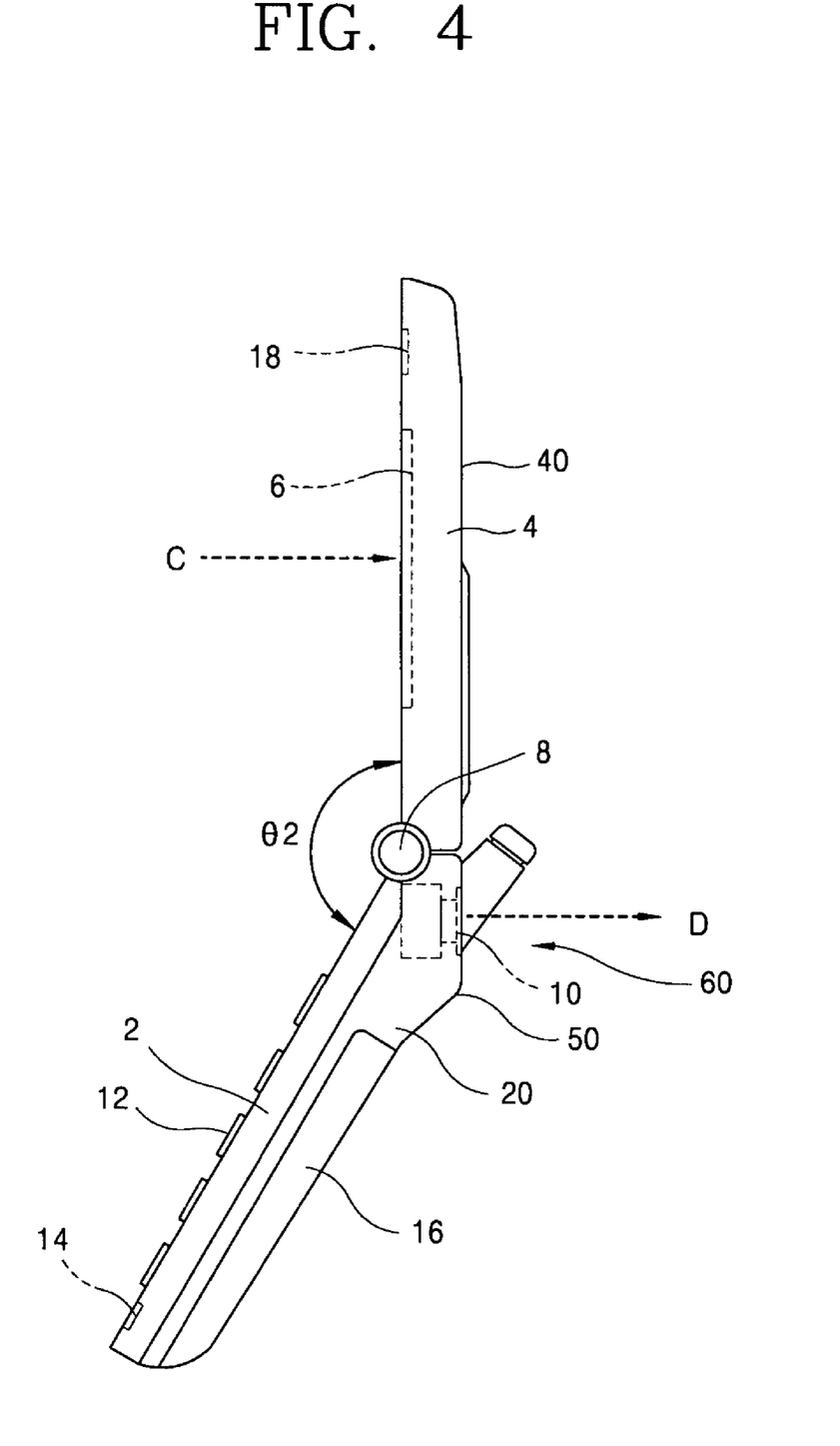
FIG. 4 is a side view of a mobile terminal with a camera, in accordance with one embodiment of the present invention, with the folder in an open state.
Figure 5:
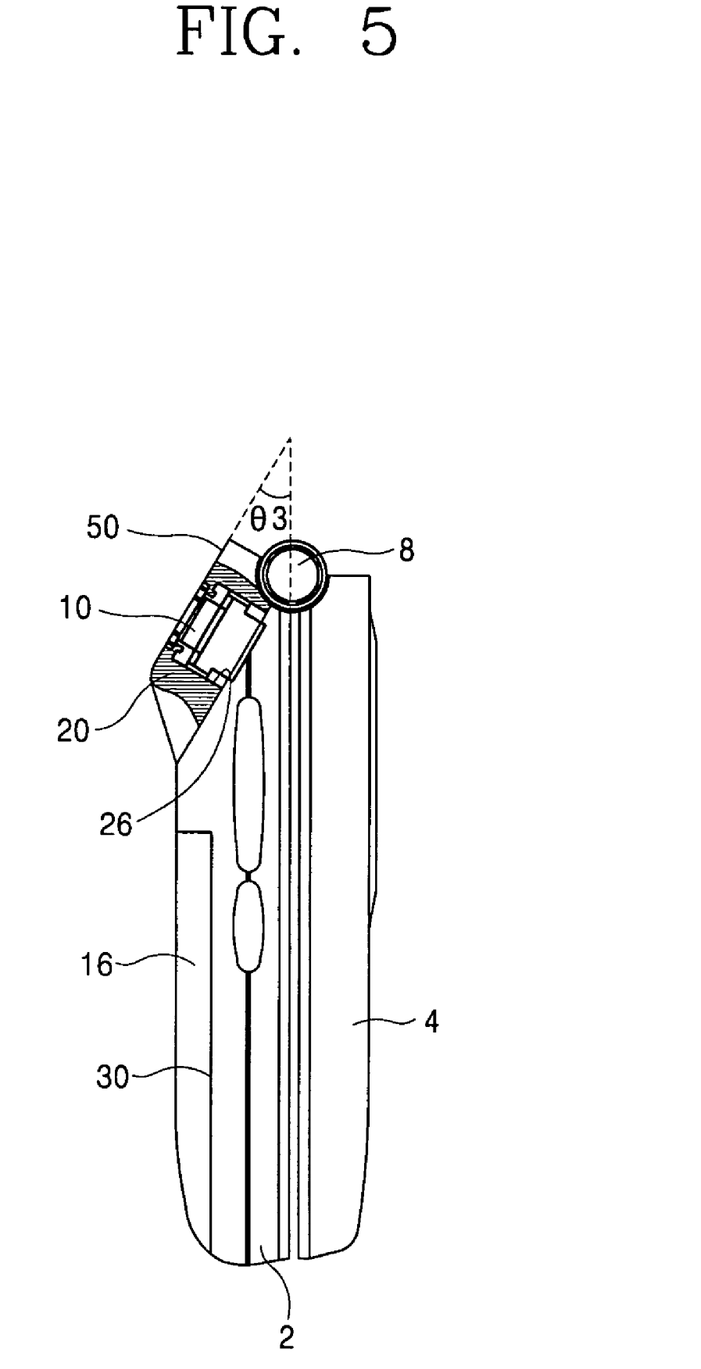
FIG. 5 is a side view of a mobile terminal with a camera, in accordance with one embodiment of the present invention, with the folder in a closed state.

FIG. 3 is a front view of a camera-attached type mobile terminal with a folder in an open state, in accordance with one embodiment of the present invention, and FIG. 4 is a side view of the camera-attached type mobile terminal shown in FIG. 3, with the folder in an open state. FIG. 5 is a side view of the mobile terminal shown in FIGS. 3 and 4, with the folder in a closed state.

The camera-attached type mobile terminal includes a main body 2, a folder 4 rotatably connected to the main body 2 and having a display 6 mounted thereon, a hinge connection part 8 foldably connecting the main body 2 and the folder 4, and a camera module 10 mounted at one side of the main body 2 for imaging a target.

The display 6 is suitably an LCD display, but can be implemented with any flat panel display, such as an electroluminescent or organic light-emitting diode display.

The main body 2 includes a main PCB (not shown), various menu buttons 12 formed at its front surface, a microphone 14 for transmitting a voice signal formed at a lower portion of its front surface, and a battery 16 mounted at its rear surface 30.

The folder 4 includes a speaker 18 for receiving a voice signal formed at an upper portion of its front surface. When the folder 4 is opened, an angle (θ2) between the folder 4 and the main body 2 is preferably maintained at approximately 150°.

The camera module 10 is mounted at an upper portion of the rear surface 30 of the main body 2 so that a direction (C) that a user looks toward to view the display 6 and an imaging direction (D) of the camera module 10 are substantially parallel. In a preferred embodiment, the imaging direction D of the camera module 10 generally corresponds to a direction that is substantially parallel to the bisector of the camera module's field of view. In a preferred embodiment, the direction C that a user looks toward to view the display 6 will generally correspond to a direction that is substantially orthogonal to a viewing surface of the display 6.

The camera module 10 is suitably an internal camera module which is inserted in the main body 2 or an external camera module which is detachably mounted on the main body 2. The camera module 10 may be a digital camera for photographing a target, or may be a video camera for taking a video of a target.

A protrusion 20 is preferably formed having a predetermined angle at an upper portion of the rear surface 30 of the main body 2, with a front surface 50 of the protrusion 20 positioned so that it is substantially level with a rear surface 40 of the folder 4 when the folder 4 is opened.

Specifically, the protrusion 20 preferably has a predetermined width at an upper portion of a rear side 60 of the main body 2 such that the normal to the front surface 50 of the protrusion 20 makes an angle of approximately 30° with respect to the normal to the rear surface of the main body 2. A camera module 10 and preferably a reflection mirror 24 are mounted at the front surface 50 of the protrusion 20.

As shown in FIG. 5, the camera module 10 is mounted at a mounting portion 26 formed at the protrusion 20 such that the angle between its imaging direction D and the front surface 50 of the protrusion 20 is approximately 90°. In one preferred embodiment, the reflection mirror 24 is mounted next to the camera module 10 and reflects an image of the user when the user images himself/herself.

The operation of the camera-attached type mobile terminal shown in FIGS. 3-5 will now be explained.

A user opens the folder 4. With the folder 4 standing upright in its open state, the user can record an image, either a still image or a video image depending on the type of camera, by manipulating the buttons 12 mounted on the main body 2, while viewing the display 6 mounted on the folder 4.

The imaging direction D of the camera module 10 and the direction that the user looks toward to view the display 6 form substantially parallel lines. Thus, the user can check and image a target accurately, and the imaging can be performed more conveniently.

Figure 6:
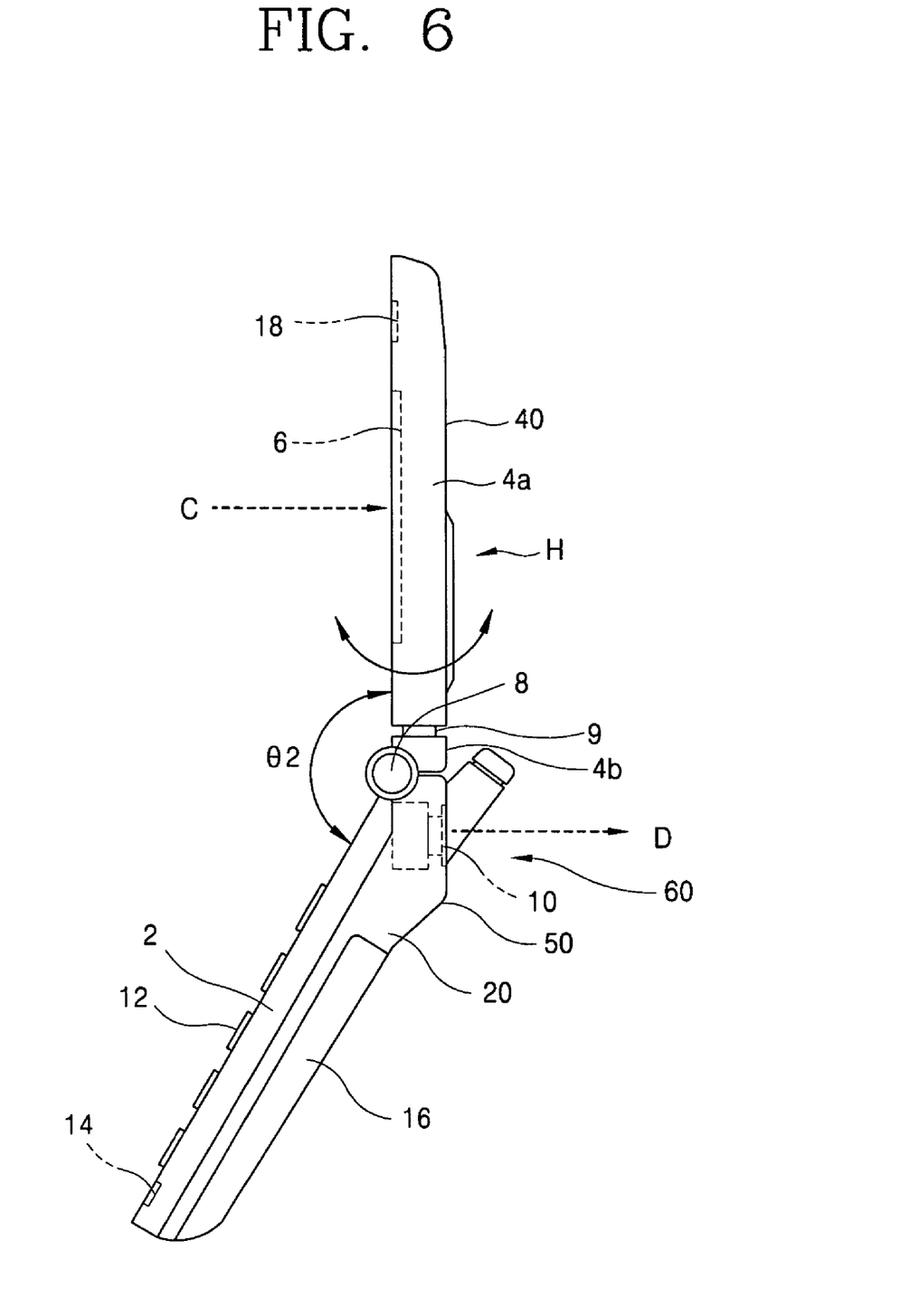
FIG. 6 is a side view of a mobile terminal with a camera in accordance with another embodiment of the present invention, with the folder in an open state.

FIG. 6 is a side view of a mobile terminal with a camera, in accordance with another embodiment of the present invention, with a folder in an open state. The embodiment of FIG. 6 is similar to the embodiments of FIGS. 3-5, except that the folder 4 is divided into a first folder portion 4A and a second folder portion 4B, with a hinge 9 rotatably connecting folder portion 4A with folder portion 4B.

The folder portion 4A is preferably rotatably connected to folder portion 4B with hinge 9 such that folder portion 4A is rotatable along a rotation axis that is orthogonal to a folding axis of hinge connection part 8, and such that it can be rotated by at least 180 degrees, and preferably 360 degrees, with respect to folder portion 4B. If folder portion 4A is rotated by 180 degrees from the position shown in FIG. 6, a user can view the display 6 while imaging himself/herself with camera module 10.

The camera-attached type mobile terminal of FIGS. 3-6 has at least the following advantages. Since the camera module 10 is installed at an upper portion of the rear side 60 of the main body 2 such that the direction that a user looks toward to view the display 6 and the camera imaging direction D form substantially parallel lines, the user can more accurately check and image or target while viewing the display 6, and the camera can be used more conveniently.

Figure 7:
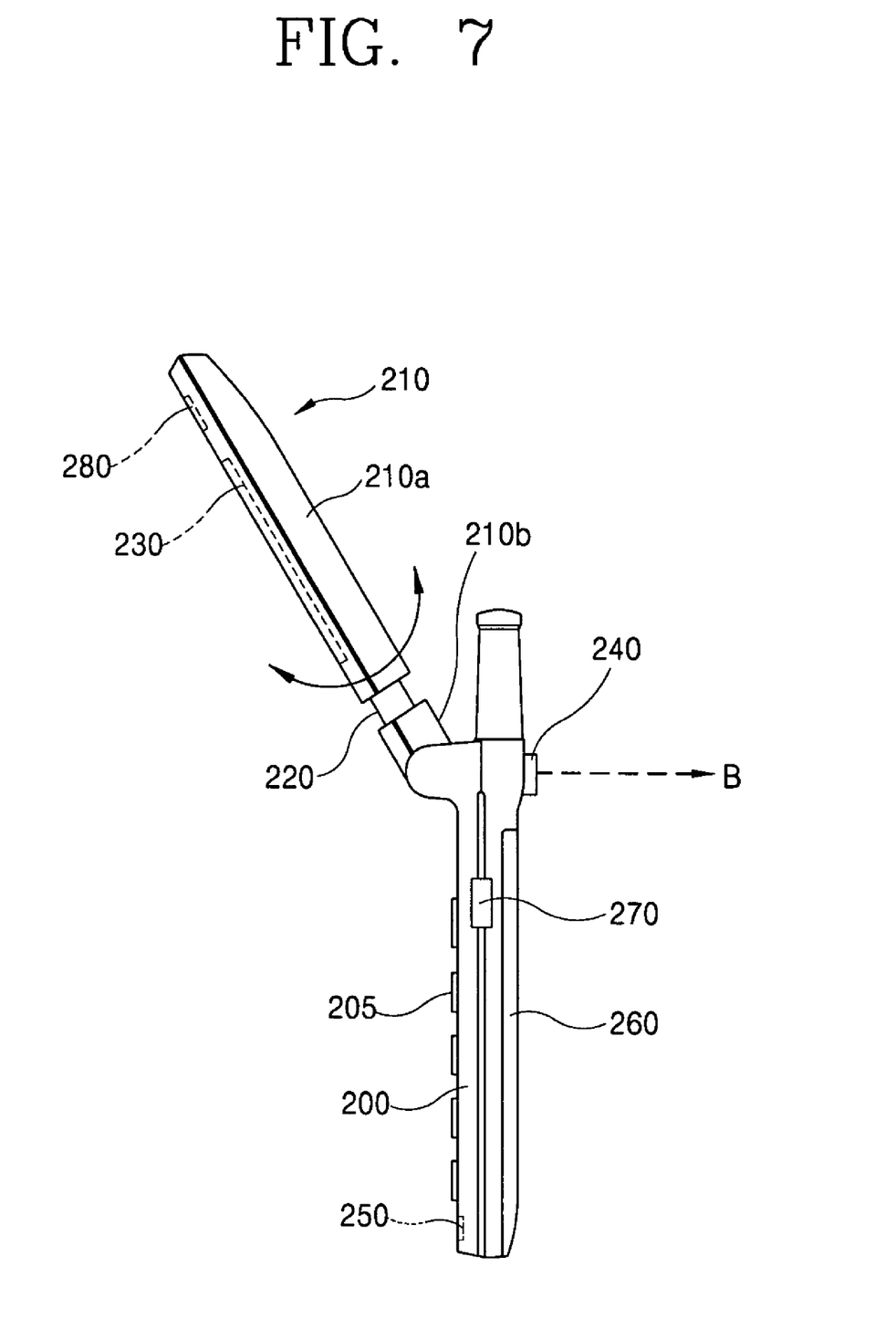
FIGS. 7-9 are side views of a mobile terminal with a camera, in accordance with another embodiment of the present invention.
Figure 8:
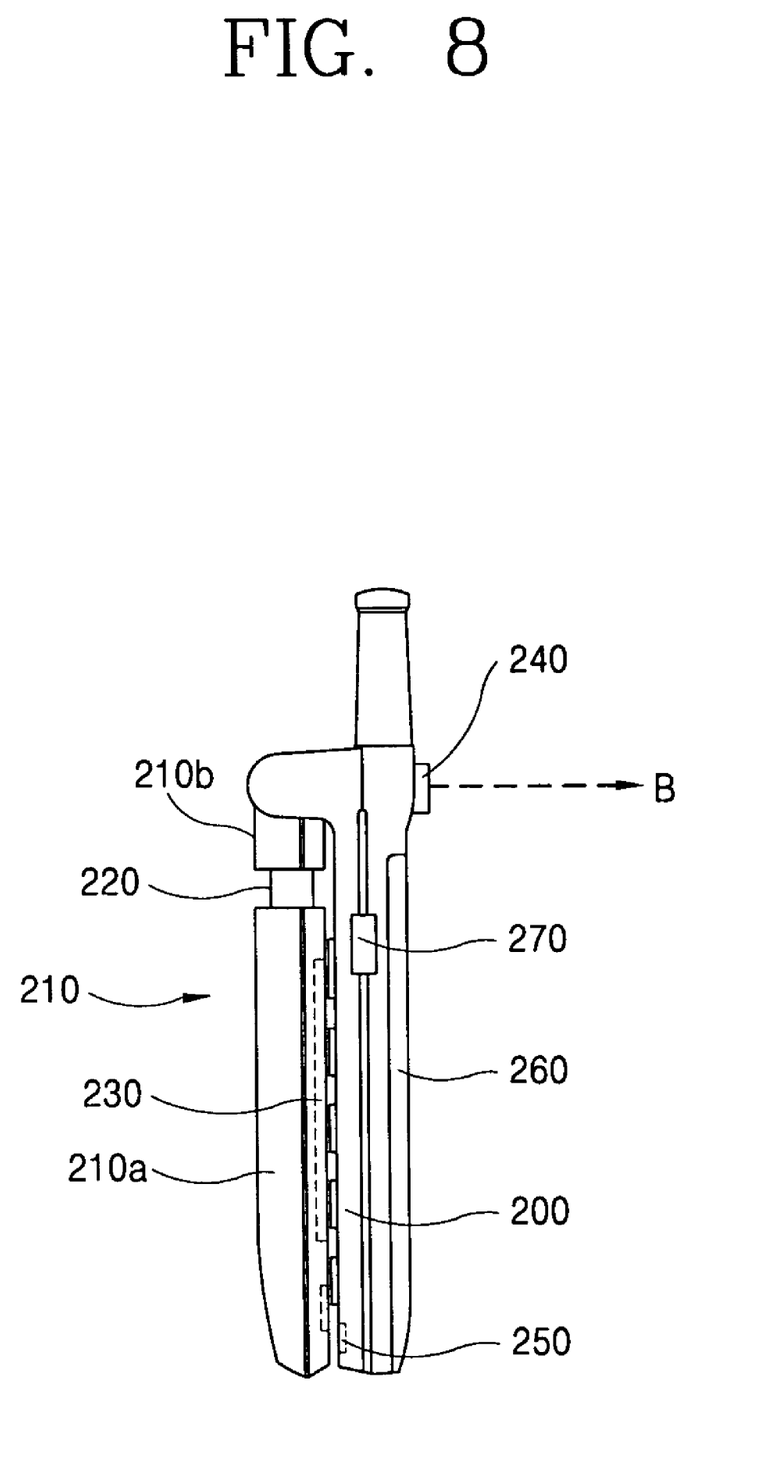
Figure 9:
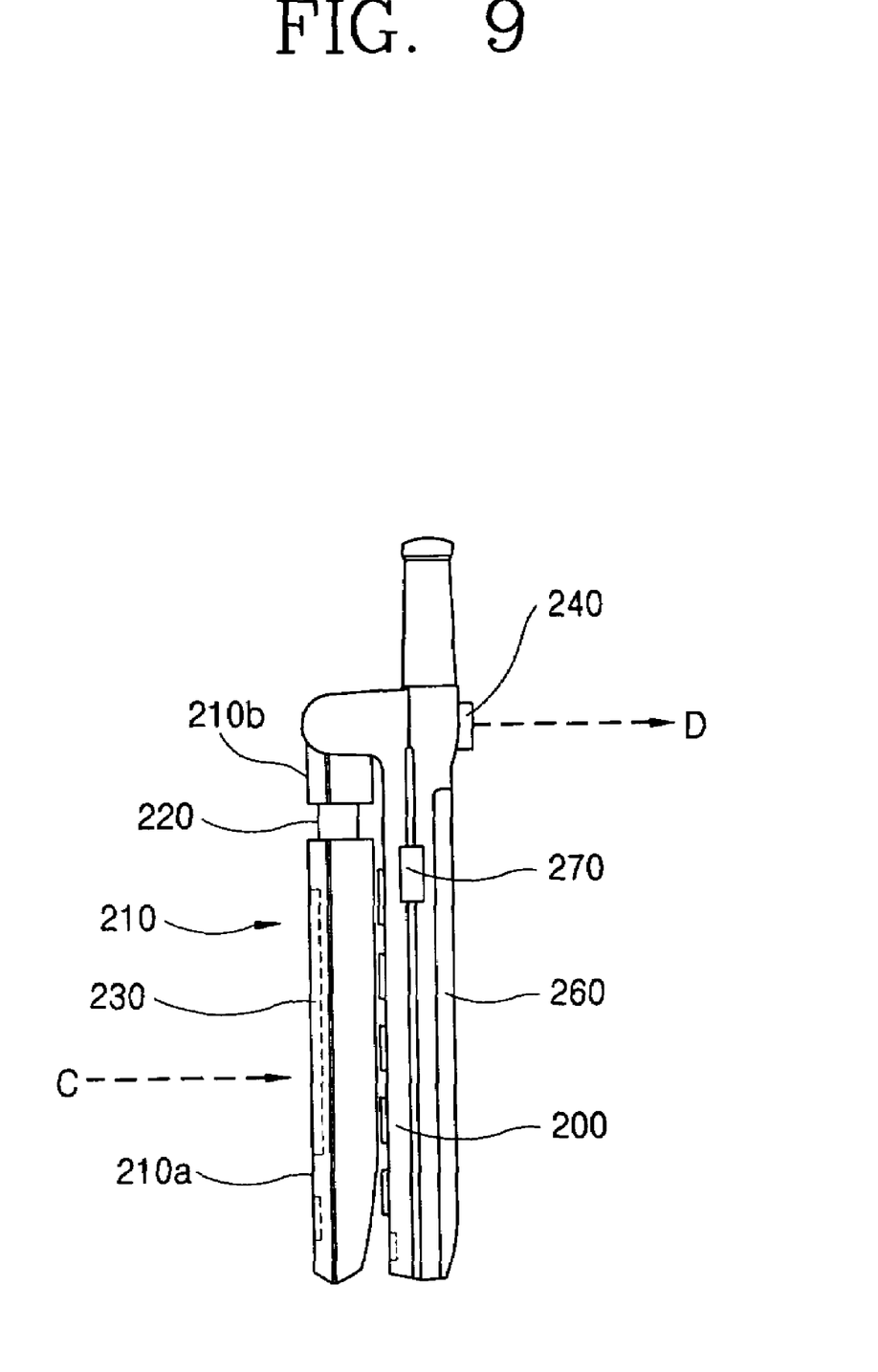

FIGS. 7-9 are side views of a mobile terminal with a camera, in accordance with another embodiment of the present invention. FIG. 7 shows the mobile terminal with a folder in an open configuration, FIG. 8 shows the mobile terminal with the folder in a first closed configuration, and FIG. 9 shows the mobile terminal with the folder in a second closed configuration.

The mobile terminal includes a main body 200 having menu buttons 205 formed at a front surface, a first folder 210 that includes a folder portion 210A rotatably connected to a second folder portion 210B with a hinge 220, a hinge (not labeled) that foldably connects folder portion 210B with the main body 200, a display 230 formed in the first folder portion 210A, and a camera module 240 mounted at a rear surface of the main body 200 for imaging a target. A microphone 250 is mounted at a lower portion of the main body 200 for receiving a voice signal, and a battery 260 is mounted at a rear surface with a main body 200. A camera control interface 270 is preferably mounted such that the camera module 240 may be operated when the folder 210 is in a closed configuration. The camera control interface 270 is suitably mounted at a side surface of the main body 200. A speaker 280 is mounted at an upper part of the folder portion 210A.

The folder portion 210A is preferably rotatably mounted to a folder portion 210B such that is rotates along a rotation axis that is orthogonal to a folding axis of the hinge that connects the folder portion 210B with the main body 200. Further, folder portion 210A is preferably rotatably mounted to folder portion 210B with hinge 220 such that folder portion 210A can be rotated by at least 180 degrees, and preferably 360 degrees, with respect to folder portion 210B. As shown in FIGS. 8 and 9, this allows for two closed configuration states.

In the closed configuration state shown in FIG. 8, folder portion 210A is rotated such that the display 230 is facing a front surface of the main body 200, such that the display 230 can not be viewed by a user. In the second closed configuration, shown in FIG. 9, folder portion 210A is rotated by 180 degrees with respect to the position shown in FIG. 8, such that the display 230 is viewable by a user.

In the second closed configuration shown in FIG. 9, a user can operate the camera module 240 using camera module control interface 270 to record an image of the target. In this configuration, a viewing direction C of the display 230 is substantially parallel to an imaging direction B of the camera module 240.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile terminal with a camera, comprising:
   a main body having a plurality of buttons formed on a front surface;
   a folder foldably connected to the main body and having a display formed thereon, the folder being foldably connected to allow an open state and a closed state, and wherein, in the closed state, the folder covers at least one of the plurality of buttons; and
   a camera module for imaging a target,
   wherein a protrusion is formed at an upper portion of a rear surface of the main body, and the camera module is provided in the protrusion, the protrusion having a surface,
   wherein the camera module is mounted such that a viewing direction of the display and an imaging direction of the camera module are substantially parallel when the folder is maintained in the opened state, the viewing direction being substantially orthogonal to a viewing surface of the display, and the imaging direction of the camera module being approximately 90 degrees from the surface of the protrusion, wherein the protrusion is formed such that the surface of the protrusion is at an angle of approximately 30° to the rear surface of the main body.

2. The mobile terminal of claim 1, wherein the camera module is mounted at a predetermined angle such that the imaging direction forms an angle of approximately 90 degrees with respect to a rear surface of the folder when the folder is in the opened state.

3. The mobile terminal of claim 2, wherein the camera module is mounted such that there is formed an angle of 30° between the imaging direction and a normal to the rear surface of the main body.

4. The mobile terminal of claim 1, wherein the protrusion with a predetermined angle is formed at the upper portion of the rear surface of the main body, and wherein the surface of the protrusion is substantially level with a rear surface of the folder when the folder is in the opened state.

5. The mobile terminal of claim 2, wherein a mirror is mounted at the surface of the protrusion for reflecting a user when the user images himself/herself.

6. The mobile terminal of claim 1, wherein the rear surface is opposite from the front surface.

7. The mobile terminal of claim 1, wherein the camera maintains a fixed position relative to the main body in the opened state.

8. The mobile terminal of claim 1, further comprising a hinge connection part coupled to the main body and to the folder, the camera being mounted within the protrusion such that the camera is not provided in the hinge connection part.

9. The mobile terminal of claim 1, wherein in the opened state, the folder and the main body are maintained at a specific angle with respect to each other.

10. The mobile terminal of claim 1, wherein the imaging direction is substantially parallel to a bisector of a field of view of a camera within the camera module.

11. A subscriber unit, comprising:
   a first terminal portion including a plurality of buttons;
   a second terminal portion foldably connected along a folding axis to the first terminal portion to allow an open configuration and a closed configuration, wherein, in the closed configuration, the second terminal portion covers at least some of the plurality of buttons;
   a display on the second terminal portion; and
   a camera mounted within the first terminal portion such that a display viewing direction is substantially parallel to a camera imaging direction when the second terminal portion is in the open configuration relative to the first terminal position, wherein the display viewing direction comprises a direction that is substantially orthogonal to a viewing surface of the display, and wherein the camera imaging direction comprises a direction that is substantially parallel to a bisector of a field of view of the camera,
   wherein a section of the first terminal portion in which the camera is mounted is wider than other sections of the first terminal portion, and the section of the first terminal portion in which the camera is mounted comprises a protruding section with a front surface that is substantially level with a rear surface of the second terminal portion when the second terminal portion is in the open configuration.

12. The subscriber unit of claim 11, wherein the camera is mounted at an upper portion of the first terminal portion.

13. The subscriber unit of claim 11, further comprising a reflecting surface mounted on the first terminal portion.

14. The subscriber unit of claim 13, wherein the reflecting surface comprises a mirror mounted adjacent to the camera such that a normal to a surface of the mirror is substantially parallel to the camera imaging direction.

15. The subscriber unit of claim 11, wherein the display comprises a flat panel display.

16. The subscriber unit of claim 15, wherein the flat panel display comprises a liquid crystal display.

17. The subscriber unit of claim 11, wherein at least a section of the second terminal portion is rotatable along an axis of rotation that is orthogonal to the folding axis.

18. The subscriber unit of claim 17, wherein the rotatable section of the second terminal portion is rotatable by at least 180 degrees.

19. The subscriber unit of claim 18, wherein the second terminal portion has a first closed configuration in which the rotatable section of the second terminal portion is positioned so that the display is facing a front surface of the first terminal portion, and a second closed configuration in which the rotatable section of the second terminal portion is rotated by substantially 180 degrees with respect to its position in the first closed configuration.

20. The subscriber unit of claim 19, further comprising a camera control interface positioned so that it can be accessed when the second terminal portion is in the first or second closed configurations.

21. The subscriber unit of claim 20, wherein the camera control interface is positioned at a side surface of the first terminal portion.

22. The subscriber unit of claim 11, wherein the camera comprises a still camera.

23. The subscriber unit of claim 11, wherein the camera comprises a video camera.

24. The subscriber unit of claim 11, wherein in the open configuration, the first terminal portion and the second terminal portion are maintained at a specific angle with respect to each other.

25. A mobile terminal comprising:
 a first body having a plurality of keys on a first surface of the first body;
 a second body coupled to the first body and moveable between an opened position and a closed position, the second body having a display, wherein, in the closed position, the second body covers at least one of the keys on the first surface of the first body; and
 a camera module; and
 a protrusion formed on a second surface of the first body opposite from the first surface, the camera module being provided in the protrusion, the protrusion having a surface that faces away from the second surface of the first body, wherein when the second body is in the opened position relative to the first body, a viewing direction of the display is substantially parallel with an imaging direction of the camera module, wherein the viewing direction is substantially orthogonal to a viewing surface of the display, and the imaging direction of the camera module is approximately 90 degrees from the surface of the protrusion.

26. The mobile terminal of claim 25, wherein the camera module is mounted at a predetermined angle such that the imaging direction forms an angle of approximately 90 degrees with respect to a rear surface of the second body when the second body is in the opened position.

27. The mobile terminal of claim 25, wherein the protrusion with a predetermined angle is formed at an upper portion of the second surface of the first body, and wherein the surface of the protrusion is substantially level with a surface of the second body when the second body is in the opened position.

28. The mobile terminal of claim 27, wherein the protrusion is formed such that the surface of the protrusion is at an angle of approximately 30° to the second surface of the first body.

29. The mobile terminal of claim 27, wherein the camera module is mounted at the protrusion so that the imaging direction of the camera makes an angle of approximately 90 degrees with respect to the surface of the protrusion.

30. The mobile terminal of claim 25, wherein the second body has a first configuration in which a rotatable section of the second body is positioned so that the display is facing the first surface of the first body, and a second configuration in which the rotatable section of the second terminal portion is rotated by substantially 180degrees with respect to its position in the first configuration.

31. The mobile terminal of claim 30, further comprising a camera control interface positioned so that it can be accessed when the first body is in the first or second configurations.

32. The mobile terminal of claim 25, wherein in the opened position, the first body and the second body are maintained at a specific angle with respect to each other.

* * * * *